United States Patent
Kim et al.

(10) Patent No.: US 12,528,930 B2
(45) Date of Patent: Jan. 20, 2026

(54) CITRATE-BASED PLASTICIZER COMPOSITION AND RESIN COMPOSITION COMPRISING SAME

(71) Applicant: LG CHEM, LTD., Seoul (KR)

(72) Inventors: Hyun Kyu Kim, Daejeon (KR); Jeong Ju Moon, Daejeon (KR); Seok Ho Jeong, Daejeon (KR); Woo Hyuk Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 907 days.

(21) Appl. No.: 17/609,541

(22) PCT Filed: Jan. 12, 2021

(86) PCT No.: PCT/KR2021/000384
§ 371 (c)(1),
(2) Date: Nov. 8, 2021

(87) PCT Pub. No.: WO2021/145642
PCT Pub. Date: Jul. 22, 2021

(65) Prior Publication Data
US 2022/0220281 A1 Jul. 14, 2022

(30) Foreign Application Priority Data
Jan. 15, 2020 (KR) .......................... 10-2020-0005439

(51) Int. Cl.
*C08K 5/11* (2006.01)
*C07C 69/34* (2006.01)

(52) U.S. Cl.
CPC ............... *C08K 5/11* (2013.01); *C07C 69/34* (2013.01)

(58) Field of Classification Search
CPC .................................. C07C 69/34; C08K 5/11
See application file for complete search history.

(56) References Cited

U.S. PATENT DOCUMENTS

| 7,595,421 B2 | 9/2009 | Grass et al. |
| 8,431,638 B2 | 4/2013 | Grass et al. |
| 2002/0198402 A1 | 12/2002 | Bohnen et al. |
| 2007/0072988 A1 | 3/2007 | Frappier et al. |
| 2007/0287781 A1 | 12/2007 | Grass et al. |
| 2011/0046283 A1 | 2/2011 | Grass et al. |
| 2017/0081501 A1 | 3/2017 | Kim et al. |

FOREIGN PATENT DOCUMENTS

| CN | 101085735 A | 12/2007 |
| CN | 101085736 A | 12/2007 |
| CN | 103113617 A | 5/2013 |
| KR | 10-2002-0085812 A | 11/2002 |
| KR | 10-2017-0020282 A | 2/2017 |
| KR | 10-2018-0039305 A | 4/2018 |
| TW | 200815338 A | 4/2008 |
| TW | 201004918 A | 2/2010 |
| WO | 03/008369 A1 | 1/2003 |
| WO | 2007/038489 A2 | 4/2007 |

OTHER PUBLICATIONS

Machine translation of KR20170020282 (Year: 2017).*
Extended European Search Rerpot issued in corresponding European Patent Application No. 21741970.4 dated Jul. 20, 2022.
International Search Report issued in corresponding International Patent Application No. PCT/KR2021/000384 dated Apr. 21, 2021.
Office Action issued on Apr. 25, 2024 in corresponding Taiwanese Patent Application No. 11320411510.
Office Action issued on Sep. 4, 2025 for the corresponding Taiwanese patent application 11420946520.

* cited by examiner

*Primary Examiner* — Wenwen Cai
(74) *Attorney, Agent, or Firm* — Morgan, Lewis & Bockius LLP

(57) ABSTRACT

The present invention relates to a plasticizer composition, including a lower alkyl-based citrate and a higher alkyl-based citrate at the same time, as citrate, wherein the ratio of a hybrid type to a non-hybrid type and the ratio of the lower alkyl groups to the higher alkyl groups are controlled so that effects are achieved. When applying the plasticizer composition to a resin, stress resistance and mechanical properties can be maintained at an equal or higher level, the migration and volatile loss properties and the plasticization efficiency can be balanced, and the light resistance and heat resistance can be remarkably improved.

5 Claims, No Drawings

CITRATE-BASED PLASTICIZER COMPOSITION AND RESIN COMPOSITION COMPRISING SAME

CROSS-REFERENCE TO RELATED APPLICATIONS

The present application claims the benefit of priority based on Korean Patent Application No. 10-2020-0005439, filed on 15 Jan. 2020, the entire disclosure of which is incorporated as part of the specification.

TECHNICAL FIELD

Technical Field

The present invention relates to a citrate-based plasticizer composition comprising a hybrid citrate of lower and higher alkyl radicals of components therein, and a resin composition comprising the same.

Background Art

Generally, a plasticizer forms an ester corresponding to the plasticizer through a reaction between an alcohol and a polycarboxylic acid such as phthalic acid or adipic acid. Also, there has been continuing research on compositions of plasticizers that can replace phthalate-based plasticizers such as terephthalate-based, adipate-based, and other polymer-based plasticizers in consideration of domestic and international regulations on phthalate-based plasticizers which are harmful to human bodies.

Meanwhile, there is an increasing demand for environmentally friendly products relating to flooring materials, wallpaper, soft and hard sheets, etc. obtained in the plastisol industry, the calendering industry, the extruding/injecting compound industry, etc., and to reinforce quality characteristics, processability and productivity of each end product for such environmentally friendly products, suitable plasticizers have to be used depending on discoloration, migration, mechanical properties, etc.

Depending on the characteristics required by industry in the various areas of use, such as tensile strength, an elongation rate, light resistance, migration properties, gelling properties, an absorption rate, etc., a PVC resin is mixed with a supplementary material such as plasticizers, fillers, stabilizers, viscosity reducing agents, dispersants, antifoaming agents, foaming agents, and the like.

For example, among the plasticizer compositions applicable to PVC, when di(2-ethylhexyl) terephthalate (DEHTP), which is relatively cheap and most widely used, was applied, hardness or sol viscosity was high, the absorption rate of the plasticizer was relatively slow, and migration properties and stress migration properties were poor.

To improve these properties, it may be considered to use a product of transesterification with butanol as a plasticizer composition containing DEHTP. However, using the product improves plasticization efficiency, but results in poor volatile loss or thermal stability, and slightly degraded mechanical properties, and thus there is a need for improvement in physical properties. In general, there is no solution as of now except to adopt a way to make up this through a combination with other secondary plasticizers.

However, using a secondary plasticizer has the following drawbacks: it is difficult to predict changes in physical properties; product unit prices may increase; improvements in physical properties are not apparent except under certain cases; and unexpected problems, such as a problem of compatibility with resin, occur.

Also, to improve the poor migration and volatile loss properties of the DEHTP product, using a material being a trimellitate-based product, such as tri(2-ethylhexyl) trimellitate or triisononyl trimellitate, improves the migration or volatile loss properties, but results in poor plasticization efficiency, and thus, there is a problem that a considerable amount should be added to provide an appropriate plasticizing effect for the resin. Moreover, the unit price of the material is relatively high, and thus, commercialization is not possible.

Accordingly, there is a need to develop a product for solving environmental issues of the phthalate-based product as an existing product, or a product having improved physical properties of the eco-friendly product to improve the environmental issues of the phthalate-based product.

DISCLOSURE OF THE INVENTION

Technical Problem

The present invention is to provide a plasticizer composition, which contains citrates, in which lower and higher alkyl radicals are appropriately controlled and bound, and thus can improve mechanical properties and stress resistance compared to conventional plasticizers and at the same time, allow balanced improvements in the migration resistance and volatile loss properties and the plasticization efficiency, and improve heat resistance (retention properties).

Technical Solution

To solve the above-described tasks, according to an embodiment of the present invention, there is provided a plasticizer composition including a citrate-based composition containing three or more citrates represented by the following Formula 1, wherein an alkyl group of the citrate is derived from a C5 alcohol and a C8 alcohol, the C5 alcohol includes one or more selected from the group consisting of n-pentanol, 2-methylbutanol, and 3-methylbutanol, and the C8 alcohol includes 2-ethyl hexanol.

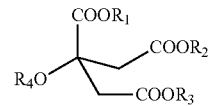

[Formula 1]

In Formula 1, $R_1$ to $R_3$ are each independently an alkyl group having five or eight carbon atoms, and $R_4$ is hydrogen or an acetyl group.

To solve the above-described tasks, according to another aspect of the present invention, there is provided a resin composition including: 100 parts by weight of a resin; and 5 to 150 parts by weight of the above-described plasticizer composition.

The resin may be one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubbers, and synthetic rubbers.

Advantageous Effects

The plasticizer composition according to an embodiment of the present invention, when being used in a resin composition, can improve mechanical properties and stress resistance compared to conventional plasticizers and at the same time, allow balanced improvements in the volatile loss properties and the plasticization efficiency, and improve the migration resistance and retention properties.

MODE FOR CARRYING OUT THE INVENTION

Hereinafter, the terms or words used in the description and claims shall not be interpreted as being limited to ordinary or dictionary meanings and the terms or words should be interpreted as meanings and concepts consistent with the technical idea of the present invention, based on the principle that an inventor may properly define the concept of a term to explain his own invention in the best way.

Definition of Terms

The term "composition" used in the description includes a mixture of materials including a corresponding composition as well as a reaction product and a decomposition product produced from the materials of the corresponding composition.

The term "straight vinyl chloride polymer" used in the description means a kind of a vinyl chloride polymer which is polymerized by suspension polymerization or bulk polymerization. This polymer has a porous particle shape having a large number of pores, a size of the particle in the range of tens to hundreds of micrometers, no cohesion, and excellent flowability.

The term "paste vinyl chloride polymer" used in the description means a kind of a vinyl chloride polymer which is polymerized by microsuspension polymerization, microseeded polymerization or emulsion polymerization. This polymer has a non-porous, minute and dense particle shape having a size in the range of tens to thousands of nanometers, cohesion, and inferior flowability.

The terms "comprising", "having" and the derivatives thereof, whether particularly disclosed or not, are not intended to preclude the presence of any additional components, steps, or procedures. In order to avoid any uncertainty, all compositions claimed by using the term "comprising" may include any additional additives, auxiliaries, or compounds, including a polymer or any other materials, unless otherwise described to the contrary. In contrast, the term "consisting essentially of" excludes unnecessary ones for operation and precludes any other components, steps or procedures from the scope of any continuous description. The term "consisting of" precludes any components, steps or procedures, which are not specifically described or listed.

Measurement Method

In the present description, analysis of the contents of components in a composition is performed by gas chromatography measurement using a gas chromatography instrument of Agilent Co. (product name: Agilent 7890 GC, column: HP-5, carrier gas: helium (flow rate 2.4 mL/min), detector: F.I.D, injection volume: 1 μL, initial value: 70° C./4.2 min, terminal value: 280° C./7.8 min, program rate: 15° C./min).

In the description, "hardness" means shore hardness (Shore "A" and/or Shore "D") at 25° C., measured under conditions of 3T 10 s by using ASTM D2240, and may be an index for evaluating plasticization efficiency. The lower the hardness is, the better the plasticization efficiency is.

In the description, "tensile strength" is measured according to ASTM D638. After pulling at a cross head speed of 200 mm/min (1T) by using a test instrument of U.T.M (manufacturer; Instron, model name; 4466), a position where a specimen is cut is measured, and the tensile strength is calculated by the following Equation 1.

Tensile strength (kgf/cm$^2$)=load value (kgf)/thickness (cm)×width (cm) [Equation 1]

In the description, "elongation rate" is measured according to ASTM D638. After pulling at a cross head speed of 200 mm/min (1T) by using the U.T.M, a position where a specimen is cut is measured, and the elongation rate is calculated by the following Equation 2.

Elongation rate (%)=length after elongation/initial length×100 [Equation 2]

In the description, "migration loss" is measured according to KSM-3156. A specimen with a thickness of 2 mm or more is obtained, and glass plates are attached onto both sides of the specimen and a load of 1 kgf/cm$^2$ is applied. The specimen is stood in a hot air circulation oven (80° C.) for 72 hours and is taken out and cooled at room temperature for 4 hours. After that, the glass plates attached onto both sides of the specimen are removed, and the weights of the glass plates and the specimen plate before and after being left standing in the oven are measured. The migration loss is calculated by the following Equation 3.

Migration loss (%)={[(initial weight of specimen at room temperature)−(weight of specimen after being left standing in oven)]/(initial weight of specimen at room temperature)}×100 [Equation 3]

In the description, "volatile loss" is obtained by processing the specimen at 80° C. for 72 hours, and measuring the weight of the specimen.

Volatile loss (wt %)={[(weight of initial specimen−weight of specimen after processing)]/(weight of initial specimen)}×100 [Equation 4]

The condition details such as temperature, rotational speed, and time among various measurement conditions may be somewhat varied by cases, and in different cases, the measurement method and the conditions thereof will be specified.

Hereinafter, the present invention will be described in more detail to help an understanding of the present invention.

According to an embodiment of the present invention, a plasticizer composition includes a citrate-based composition containing three or more citrates represented by the following Formula 1, wherein an alkyl group of the citrate is derived from a C5 alcohol and a C8 alcohol, the C5 alcohol includes one or more selected from the group consisting of n-pentanol, 2-methylbutanol, and 3-methylbutanol, and the C8 alcohol includes 2-ethyl hexanol.

[Formula 1]

In Formula 1, $R_1$ to $R_3$ are each independently an alkyl group having five or eight carbon atoms, and $R_4$ is hydrogen or an acetyl group.

The plasticizer composition according to an embodiment of the present invention is characterized in that citrate is hybridized through the C5 alcohol and the C8 alcohol. It has a very good balance between physical properties compared to that of non-hybridized citrate. Using a lower alcohol having a smaller number of carbon atoms than the C5 alcohol or a higher alcohol having a smaller number of carbon atoms than the C8 alcohol may result in a marked deterioration of mechanical properties and poor retention properties. Also, using lower or higher alcohols having larger numbers of carbon atoms than each of the defined number of carbon atoms may result in a significant deterioration of stress resistance and migration resistance. Accordingly, it may be desirable to use the C5 alcohol and the C8 alcohol as the alcohol.

Specifically, the citrate-based composition may include: a lower alkyl-based citrate including a lower non-hybrid citrate having a C5 alcohol-derived alkyl group, and a lower hybrid citrate having a C5 alcohol-derived alkyl group and a C8 alcohol-derived alkyl group, in which the C5 alcohol-derived alkyl groups are more than the C8 alcohol-derived alkyl groups; and a higher alkyl-based citrate including a higher hybrid citrate having a C5 alcohol-derived alkyl group and a C8 alcohol-derived alkyl group, in which the C8 alcohol-derived alkyl groups are more than the C5 alcohol-derived alkyl groups, and a higher non-hybrid citrate having a C8 alcohol-derived alkyl group.

More specifically, according to an embodiment of the present invention, the citrate-based composition contained in the plasticizer composition contains a total of four types of citrates, which can be largely classified into higher alkyl-based citrates having two or more C8 alkyl groups bound (Formulas 1-4 to 1-6) and lower alkyl-based citrates having two or more C5 alkyl groups bound (Formulas 1-1 to 1-3). Also, the lower alkyl-based citrates can be subdivided into a lower non-hybrid citrate (Formula 1-1), in which the C5 alkyl groups are bound to all the three ester groups, and lower hybrid citrates (Formulas 1-2 and 1-3), in which the C5 alkyl groups are bound to two ester groups. Similarly, the higher alkyl-based citrates can be divided into a higher non-hybrid citrate (Formula 1-6) and higher hybrid citrates (Formulas 1-4 and 1-5). In detail, for the citrates represented by Formulas 1-3 and 1-5, optical isomers may exist due to the presence of a chiral carbon, but in the present specification, the optical isomers are not treated separately as different compounds.

Herein, the term "having . . . alkyl groups bound" may mean "having . . . alkyl groups bound to three ester groups of the citrate.

Also, the term "non-hybrid" or "hybrid" distinguishes, based on the alkyl groups bound to three esters, whether alkyl radicals having the same number of carbon atoms only are bound or alkyl radicals having a different number of carbon atoms are mixed to be bound. When alkyl radicals having the same number of carbon atoms are bound to all the three ester groups, it may be referred to as "non-hybrid." When alkyl radicals having a different number of carbon atoms are mixed to be bound to the three ester groups, it may be referred to as "hybrid." In detail, the hybrid and non-hybrid are distinguished based on the number of carbon atoms. For example, when only pentyl groups having the same number of carbon atoms are bound, even if the n-pentyl group and a branched pentyl group are mixed, the number of carbon atoms thereof is identical, and thus it means "non-hybrid" in the present specification.

Formulas 1-1 to 1-6 each representing the higher alkyl-based citrates and the lower alkyl-based citrates in the citrate-based composition are shown as follows:

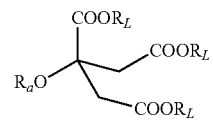

[Formula 1-1]

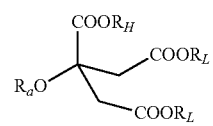

[Formula 1-2]

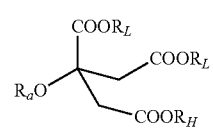

[Formula 1-3]

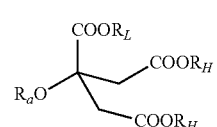

[Formula 1-4]

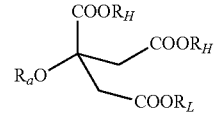

[Formula 1-5]

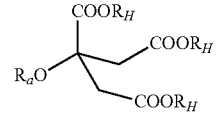

[Formula 1-6]

In Formulas 1-1 to 1-6, $R_L$ is n-pentyl group or a branched pentyl group, $R_H$ is 2-ethylhexyl group, and $R_a$ is hydrogen or an acetyl group.

The plasticizer composition may be a product produced by direct esterification of a mixture of citric acid or a citric acid derivative and an alcohol having an alkyl group having five or eight carbon atoms, or by transesterification of a citrate having an alkyl group having five (or eight) carbon atoms and an alcohol having eight (or five) carbon atoms. Herein, the alcohol to be applied may be a mixture of structural isomers or any single substance. For example, the alcohol having five carbon atoms may be purified n-pentanol alone, or a branched pentanol purified to have any isomeric composition in the product prepared from pentanol alone or a mixture. For example, the alcohol having eight carbon atoms may be 2-ethyl hexanol alone. The alcohol having five carbon atoms may be a mixture of pentanol of which isomers are unpurified or a mixture of two or more selected from the group consisting of 1-methyl butyl group, 2-methyl butyl group, 3-methyl butyl group, 1-ethyl propyl group, 2-ethyl propyl group, 1,1-dimethyl propyl group, 1,2-dimethyl propyl group, and 2,2-dimethyl propyl group, which are collectively termed as branched pentanol. Preferably, the isopentanol may be selected from the group consisting of 2-methyl butyl group, 3-methyl butyl group, 2-ethyl propyl group, and 2,2-dimethyl propyl group.

The plasticizer according to an embodiment of the present invention includes a total of four types of citrates as described above, and thus excellent effects can be implemented by a combination of alkyl groups suitably bound to each type.

Specifically, the plasticization efficiency and physical properties such as migration/volatile loss properties can be balanced due to the balance of the alkyl groups between the higher non-hybrid citrates and the lower non-hybrid citrates and coexistence of hybrid types in the composition, moreover, characteristics such as the controlled ratio of the lower alkyl groups and the higher alkyl groups among all the alkyl radicals, furthermore, when any one alkyl group is derived from a mixed alcohol, the ratio of certain branched alkyl radicals in the branched alkyl groups. Due to the interaction of the four types of citrates contained in the composition, remarkable improvement in mechanical properties, stress resistance, and retention properties can be achieved.

Thus, a product free from environmental issues of existing phthalate-based products and having more improved volatile loss property can be implemented, and the migration and volatile loss properties of conventional terephthalate-based products can be significantly improved, and a product having greatly improved mechanical properties and stress resistance compared to existing commercial products can be implemented.

To more optimally and preferably achieve the above effects, it may be important to meet the conditions of $R_L$ and $R_H$ defined in Formulas 1 to 6.

As defined above, $R_L$ and $R_H$ may each be n-pentyl group or a branched pentyl group, and 2-ethylhexyl group. These alkyl radicals are factors that can determine the interaction between each type of citrates contained in the citrate-based plasticizer composition and the weightiness of the entire composition and may play a major role in achieving the effects.

Preferably, $R_L$ is an alkyl group having five carbon atoms, may be n-pentyl group or a branched pentyl group. Specifically, the branched pentyl group may be one selected from the group consisting of 1-methyl butyl group, 2-methyl butyl group, 3-methyl butyl group, 1-ethyl propyl group, 2-ethyl propyl group, 1,1-dimethyl propyl group, 1,2-dimethyl propyl group, and 2,2-dimethyl propyl group. More preferably, $R_L$ may be n-pentyl group, 2-methyl butyl group, or 3-methyl butyl group.

According to an embodiment of the present invention, the C5 alcohol may include essentially n-pentanol. There are various isomers of the C5 alcohol. It may be preferable that n-pentanol among those is included as the C5 alcohol. n-Pentanol is a linear alcohol, and the intermolecular interaction and steric hindrance effect can be appropriately controlled, and thus, the performance of the plasticizer can be improved. This may be caused by a synergistic effect in connection with the fact that 2-ethyl hexanol, a higher alcohol, is a branched alcohol.

Also, the C5 alcohol includes n-pentanol but may include at least one branched alcohol selected from 2-methylbutanol and 3-methylbutanol, and n-pentanol may be included in an amount of 50 wt % or more based on the total weight of the C5 alcohol. The C5 alcohol may be used in the form of a mixture of isomers, wherein when n-pentanol is included in an amount of 50 wt % or more in the mixture, the plasticizer performance may become more excellent.

In the plasticizer composition according to an embodiment of the present invention, to further optimize the implementation of the effects according to the present invention, the ratio of each alkyl group may be adjusted. Firstly, the weight ratio of the lower alkyl-based citrate to the higher alkyl-based citrate may be controlled to 95:5 to 10:90, preferably, 90:10 to 10:90, or 90:10 to 15:85, more preferably, 90:10 to 20:80, and even more preferably, 90:10 to 30:70. By using the lower alkyl-based citrates, which are represented by Formulas 1-1 to 1-3, more than the higher alkyl-based citrates (Formulas 1-4 to 1-6), the weightiness of the entire plasticizer composition can be controlled, and accordingly, a significant improvement in the performance of the plasticizer composition can be expected.

In more detail, a factor that controls the structural properties of the plasticizer composition according to an embodiment of the present invention is controlling the weight ratio of the non-hybrid citrates represented by Formulas 1-1 and 1-6 to the hybrid citrates represented by Formulas 1-2 to 1-5. The weight ratio of the non-hybrid citrates to the hybrid citrates may be 80:20 to 5:95, preferably, 70:30 to 10:90, and more preferably, 60:40 to 20:80. In the esterification process for preparing the composition, the amount of the product to which the mixed alkyl groups are bound can be controlled by controlling the reaction, and thus, it can play a significant role in achieving the effects.

Likewise, controlling the weight ratio of the higher non-hybrid citrates represented by Formula 1-6 to the higher hybrid citrates represented by Formulas 1-4 and 1-5 among the higher alkyl-based citrates may also play a similar role. The weight ratio may be 5:95 to 80:20, preferably, 10:90 to 60:40, and more preferably, 20:80 to 50:50. That is, it is necessary to note that the effect of the resulting plasticizer composition can be improved by controlling the weight ratio between citrates included in the higher alkyl-based citrates through appropriate control during the reaction.

When the components of the plasticizer composition according to the present invention are composed within the above ranges, considering the equivalent ratio of substances used as reactants, actual yield, conversion rate, etc. of the reaction, productivity in the manufacturing process can be increased, deterioration of mechanical properties such as tensile strength and elongation rate, described above, can be prevented, and a significant improvement in light resistance can be exhibited.

Meanwhile, the substituent defined as Ra in the citrate may be hydrogen or an acetyl group. For improvement and optimization of physical properties of the plasticizer, particularly processability, melting properties, and mechanical properties, such as elongation rate, due to a decrease in plasticization efficiency, hydrogen may be more preferable. Also, when the substituent is an acetyl group, it is necessary to take into account that it may be difficult to rule out the problem of lowering economic efficiencies such as an increase in cost due to production problems such as the addition of production processes and treatment facilities due to the generation of waste acetic acid.

The method for preparing the plasticizer composition according to an embodiment of the present invention is a well-known method in the art, and any methods can be applied without specific limitation, so long as the above-described plasticizer composition is prepared.

For example, the composition can be prepared through direct esterification of citrate or an anhydride thereof and two or more kinds of alcohols. Also, the composition can be prepared through transesterification of citrate and one kind of alcohol.

The plasticizer composition according to an embodiment of the present invention is a material prepared by appropriately performing the esterification. Thus, as long as the above-described conditions are fulfilled, in particular, as long as the ratio of the branched alcohol in the isomers-mixed alcohol is controlled, there is no particular limitation on the preparation methods.

For example, the direct esterification may be performed by a step for introducing citric acid and two or more kinds of alcohols, adding a catalyst and reacting under a nitrogen atmosphere; a step for removing unreacted alcohols and neutralizing unreacted acid; and a step for dehydrating by distillation in a reduced pressure and filtering.

The alcohol may be a monoalcohol having an alkyl group corresponding to $R_H$ and $R_L$ in the Formulas 1-1 to 1-6. The weight ratio of a monoalcohol having the alkyl group of $R_L$ and a monoalcohol having the alkyl group of $R_H$ may function as an important factor for determining the ratio of components in the prepared composition. For example, the weight ratio of the C5 alcohol and the C8 alcohol may be 90:10 to 10:90, preferably, 90:10 to 20:80, more preferably, 90:10 to 25:75, and even more preferably, 90:10 to 30:70.

The alcohol may be used in a range of 150 to 500 mol %, 200 to 400 mol %, 200 to 350 mol %, 250 to 400 mol %, or 270 to 330 mol % based on 100 mol % of the acid. By controlling the content of this alcohol, the ratio of components in the final composition can be controlled.

The catalyst may be, for example, an acid catalyst such as sulfuric acid, hydrochloric acid, phosphoric acid, nitric acid, paratoluene sulfonic acid, methane sulfonic acid, ethane sulfonic acid, propane sulfonic acid, butane sulfonic acid, and alkyl sulfate, a metal salt such as aluminum lactate, lithium fluoride, potassium chloride, cesium chloride, calcium chloride, iron chloride, and aluminum phosphate, a metal oxide such as heteropoly acids, natural/synthetic zeolites, cation and anion exchange resins, and an organometal such as tetra alkyl titanate and polymers thereof. A specific example of the catalyst may be tetra alkyl titanate. Preferably, as an acid catalyst having a low active temperature, paratoluene sulfonic acid, methane sulfonic acid, or the like may be appropriate.

The amount used of the catalyst may be different according to the kind. For example, a homogeneous catalyst may be used in an amount of 0.01 to 5.0 wt %, 0.01 to 3.0 wt %, 1.0 to 5.0 wt % or 2.0 to 4.0 wt % based on total 100 wt % of the reactants, and a heterogeneous catalyst may be used in an amount of 5 to 200 wt %, 5 to 100 wt %, 20 to 200 wt % or 20 to 150 wt % based on the total amount of the reactants.

Herein, the reaction temperature may be in a range of 180 to 280° C., 200 to 250° C., or 210 to 230° C.

As another example, the transesterification may be a reaction of citrate and alcohols having alkyl radicals having a different number of carbon atoms from the alkyl radicals of the citrate (for the citrate having the higher alkyl group bound, the lower alkyl alcohols; for the citrate having the lower alkyl group, the higher alkyl alcohols). Herein, the alkyl groups of the citrate and the alcohol may be crossed over each other.

"Transesterification" used in the present invention means the reaction of an alcohol and an ester to interchange an alkyl of the ester with an alkyl of the alcohol:

In the case of the citrates included in the plasticizer composition according to the present invention, according to the ester group bonding position, when two ester groups are interchanged, and when one ester group is interchanged, three types may be formed respectively, and accordingly, in the final composition, a mixture of up to 8 compounds (including structural isomers and optical isomers) may be present.

In addition, the transesterification has the advantage of not generating wastewater problems when compared with the esterification between acid-alcohol.

The composition ratio of the mixture prepared through the transesterification may be controlled according to the addition amount of the alcohol. The addition amount of the alcohol may be 10 to 200 parts by weight, specifically, 20 to 150 parts by weight, more particularly, 30 to 120 parts by weight based on 100 parts by weight of the citrate compound. For reference, a determinant for the ratio of components in the final composition may be the addition amount of the alcohol as in the direct esterification.

That is, in the citrate-based composition, since the mole fraction of the citrate participating in the transesterification can increase according to the increase of the addition amount of the alcohol, the content of citrate, which is the product, in the mixture can increase, and correspondingly, the content of the unreacted citrate can tend to decrease.

According to an embodiment of the present invention, the molar ratio of the reactants, citrate and alcohols may be, for example, 1:0.005 to 1:10, 1:0.05 to 1:8, or 1:0.1 to 1:6, and within this range, processing efficiency and economic feasibility can be excellent and a plasticizer composition capable of achieving the above-described effects can be obtained.

According to an embodiment of the present invention, the transesterification may be performed at a temperature of 120 to 190° C., preferably, 135 to 180° C., more preferably, 141 to 179° C. for 10 minutes to 10 hours, preferably, 30 minutes to 8 hours, more preferably, 1 to 6 hours. Within the temperature and time ranges, the ratio of components in the final plasticizer composition can be efficiently controlled. Herein, the reaction time may be calculated from a point when the temperature of the reactants is elevated and arrives at the reaction temperature.

The transesterification may be performed under an acid catalyst or a metal catalyst. Herein, the reaction time can be shortened.

The acid catalyst may be, for example, sulfuric acid, methanesulfonic acid, or p-toluene sulfonic acid, and the metal catalyst may be, for example, an organometal catalyst, a metal oxide catalyst, a metal salt catalyst or a metal itself.

The metal component may be, for example, any one selected from the group consisting of tin, titanium and zirconium, or a mixture of two or more thereof.

In addition, a step for removing unreacted alcohols and reaction by-products by distillation may be further included after the transesterification. The distillation may be, for example, a two-step distillation by which the alcohols and the by-products are individually separated using the difference of the boiling points. As another example, the distillation may be mixture distillation. In this case, the effects of stably securing an ester-based plasticizer composition in a desired composition ratio can be achieved. The mixture distillation means distillation of the unreacted alcohols and the by-products simultaneously.

According to another embodiment of the present invention, a resin composition including the plasticizer composition described above and a resin is provided.

The resin may be one well-known in the art. For example, a mixture of one or more selected from, but not limited to, the group consisting of a straight vinyl chloride polymer, a paste vinyl chloride polymer, an ethylene vinyl acetate copolymer, an ethylene polymer, a propylene polymer, polyketone, polystyrene, polyurethane, natural rubbers, and synthetic rubbers may be used.

The plasticizer composition may be included in an amount of 5 to 150 parts by weight, preferably, 5 to 130 parts by weight, or 10 to 120 parts by weight based on 100 parts by weight of the resin.

Generally, the resin for which the plasticizer composition is used can be prepared into a resin product through melt processing or plastisol processing, and a resin prepared by melt processing and a resin prepared by plastisol processing may be produced differently according to each polymerization method.

For example, in the case of using a vinyl chloride polymer in melt processing, solid-phase resin particles having a large average particle diameter are prepared by suspension polymerization or the like and used, and the vinyl chloride polymer is a straight vinyl chloride polymer. In the case of using a vinyl chloride polymer in plastisol processing, a sol state resin in which minute resin particles are distributed is prepared by emulsion polymerization or the like and used, and the vinyl chloride polymer is a paste vinyl chloride resin.

In the case of the straight vinyl chloride polymer, a plasticizer may be included in a range of 5 to 150 parts by weight, preferably, 5 to 80 parts by weight based on 100 parts by weight of the polymer. In the case of the paste vinyl chloride polymer, the plasticizer may be included in a range of 5 to 150 parts by weight, preferably, 40 to 120 parts by weight based on 100 parts by weight of the polymer.

The resin composition may further include a filler. The filler may be present in an amount of 0 to 300 parts by weight, preferably, 50 to 200 parts by weight, more preferably, 100 to 200 parts by weight based on 100 parts by weight of the resin.

The filler may be a well-known filler in the art and is not particularly limited. For example, the filler may be a mixture of one or more selected from silica, magnesium carbonate, calcium carbonate, hard coal, talc, magnesium hydroxide, titanium dioxide, magnesium oxide, calcium hydroxide, aluminum hydroxide, aluminum silicate, magnesium silicate, and barium sulfate.

In addition, the resin composition may further include other additives, such as a stabilizer, as needed. Each of the other additives, such as a stabilizer, may be included, for example, in an amount of 0 to 20 parts by weight, and preferably 1 to 15 parts by weight based on 100 parts by weight of the resin.

The stabilizer may be, for example, but is not particularly limited to, a calcium-zinc-based (Ca—Zn-based) stabilizer such as a composite stearate of calcium-zinc, or a barium-zinc-based (Ba—Zn-based) stabilizer.

The resin composition can be applied to both melt processing and plastisol processing as described above. For example, calendering processing, extrusion processing, or injection processing can be applied for melt processing, and coating processing, or the like can be applied for plastisol processing.

EXAMPLES

Hereinafter, the present invention will be described in more detail by examples. Examples according to the present invention may be modified into various other types, and the scope of the present invention should not be limited to examples described below. The examples of the present invention are provided for completely explaining the present invention to a person having an average knowledge in the art.

Examples 1 to 5

To a reactor equipped with a stirrer, a condenser and a decanter, 500 g of citric acid anhydride, 642 g of n-pentanol, 406 g of 2-ethyl hexanol, and 2 g of tetrabutyl titanate (TnBT) were introduced and esterification was carried out under a nitrogen atmosphere. The reaction was completed and unreacted alcohols were removed. Then, the catalyst and the composition were neutralized and washed with an alkaline solution. A purification process of removing unreacted alcohols and water was carried out to obtain the composition of Example 1 containing tri(n-pentyl) citrate, di(n-pentyl) (2-ethylhexyl) citrate, di(2-ethylhexyl) (n-pentyl) citrate, and tri(2-ethylhexyl) citrate in an amount of 26.5 wt %, 45.1 wt %, 24.2 wt %, and 4.2 wt %, respectively.

In the above reaction, the types and introduction amounts of reactants were adjusted to prepare the compositions of Examples 2 to 5 having the compositions as shown in Table 1 below.

Examples 6 to 8

To a reactor equipped with a stirrer, a condenser and a decanter, 500 g of citric acid anhydride, 1,320 g of 2-ethyl hexanol, and 2 g of tetrabutyl titanate (TnBT) were introduced and esterification was carried out under a nitrogen atmosphere to prepare tri(2-ethylhexyl) citrate.

To a reactor equipped with a stirrer, a condenser and a decanter, 1,000 g of the prepared tri(2-ethylhexyl) citrate and 200 g of n-pentyl alcohol (20 parts by weight based on 100 parts by weight of TEHC) were introduced and transesterification was carried out under a nitrogen atmosphere at a reaction temperature of 160° C. for 2 hours to obtain the composition of Example 6 containing tri(n-pentyl) citrate, di(n-pentyl) (2-ethylhexyl) citrate, di(2-ethylhexyl) (n-pentyl) citrate, and tri(2-ethylhexyl) citrate in an amount of 2.1 wt %, 16.9 wt %, 44.0 wt %, and 37.0 wt %, respectively.

In the above reaction, the types and introduction amounts of reactants were adjusted to prepare the compositions of Examples 7 and 8 having the compositions as shown in Table 1 below.

Comparative Example 1

Dioctyl phthalate (DOP, LG Chemical, LTD.) was used as a plasticizer.

Comparative Example 2

Diisononyl phthalate (DINP, LG Chemical, LTD.) was used as a plasticizer.

Comparative Example 3

Di(2-ethylhexyl) terephthalate (GL300, LG Chemical, LTD.) was used as a plasticizer.

Comparative Examples 4 to 6

The same reaction as in Example 1 was carried out except for using only 2-ethyl hexanol instead of 2-ethyl hexanol and n-pentanol as the alcohols in Example 1 to obtain tri(2-ethylhexyl) citrate of Comparative Example 4.

In Comparative Examples 5 and 6, the alcohol in Comparative Example 4 was changed to the alcohols shown in Table 1 below.

Comparative Examples 7 to 14

The same reaction as in Example 6 was carried out except for changing the alcohols used for direct esterification and the higher alcohols and lower alcohols used for transesterification to those shown in Table 1 below, respectively, to obtain citrate compositions.

TABLE 1

| Classification | Lower alcohols | Higher alcohols | Introduction amount of alcohols | Product composition | | | |
|---|---|---|---|---|---|---|---|
| | | | | Lower non-hybrid | Lower hybrid | Higher hybrid | Higher non-hybrid |
| Example 1 | n-P | 2-EH | C5:C8 = 7:3 | 26.5 | 45.1 | 24.2 | 4.2 |
| Example 2 | 3-MB | 2-EH | C5:C8 = 7:3 | 27.5 | 45.2 | 23.5 | 3.8 |
| Example 3 | n-P:3-MB (9:1) | 2-EH | C5:C8 = 5:5 | 12.4 | 34.5 | 37.3 | 15.8 |
| Example 4 | n-P:3-MB (7:3) | 2-EH | C5:C8 = 5:5 | 12.0 | 34.2 | 37.5 | 16.3 |
| Example 5 | n-P:3-MB (9:1) | 2-EH | C5:C8 = 9:1 | 35.6 | 45.7 | 17.5 | 1.2 |
| Example 6 | n-P | 2-EH | C5 20% of TEHC | 2.1 | 16.9 | 44.0 | 37.0 |
| Example 7 | n-P | 2-EH | C5 30% of TEHC | 4.5 | 25.8 | 45.0 | 24.7 |
| Example 8 | n-P | 2-EH | C5 40% of TEHC | 8.0 | 32.0 | 41.2 | 18.8 |
| Comparative Example 4 | | 2-EH | — | — | — | — | — |
| Comparative Example 5 | | n-P | — | — | — | — | — |
| Comparative Example 6 | | n-Hp | — | — | — | — | — |
| Comparative Example 7 | n-B | 2-EH | C4 20% of TEHC | 3.2 | 19.7 | 42.8 | 34.3 |
| Comparative Example 8 | n-B | 2-EH | C8 30% of TBC | 26.7 | 42.5 | 24.3 | 6.5 |
| Comparative Example 9 | n-B | 2-EH | C4 40% of TEHC | 11.0 | 32.2 | 42.3 | 14.5 |
| Comparative Example 10 | n-B | IN | C4 20% of TINC | 2.8 | 18.2 | 44.0 | 35.0 |
| Comparative Example 11 | n-P | IN | C5 20% of TINC | 3.0 | 18.5 | 44.1 | 34.4 |
| Comparative Example 12 | n-Hx | 2-EH | C6 30% of TEHC | 5.2 | 27.0 | 44.7 | 23.1 |
| Comparative Example 13 | n-P | n-Hp | C5 20% of THpC | 2.4 | 17.5 | 43.2 | 36.9 |
| Comparative Example 14 | n-B | n-Hx | C4 30% of THxC | 6.2 | 28.6 | 43.1 | 22.1 | n-P: n-pentanol
3-MB: 3-methylbutanol
2-EH: 2-Ethyl hexanol
n-Hp: n-heptanol
n-B: n-butanol
n-Hx: n-hexanol
IN: isononanol In Table 1 above, "C5 20% of TEHC" means 20 parts by weight of the C5 alcohol based on 100 parts by weight of TEHC and similar descriptions can be construed equally.

Experimental Example 1: Evaluation of Sheet Performance

By using the plasticizers of Examples and Comparative Examples, specimens were manufactured according to the formulation and manufacturing conditions below and ASTM D638.
(1) Formulation: 100 parts by weight of a straight vinyl chloride polymer (LS100S), 30 parts by weight of a plasticizer, and 3 parts by weight of a stabilizer (BZ-153T)
(2) Mixing: mixing at 98° C. in 700 rpm
(3) Manufacture of specimen: 1T, 2T, and 3T sheets were manufactured by processing at 160° C. for 4 minutes using a roll mill, and at 180° C. for 2.5 minutes (low pressure) and 2 minutes (high pressure) using a press.
(4) Evaluation Items
1) Hardness: Shore hardness (Shore "A" and "D") at 25° C. was measured using a 3T specimen for 10 seconds using ASTM D2240. It is evaluated that the smaller the value is, the better the plasticization efficiency is.
2) Tensile strength: By ASTM D638 method, a specimen was drawn in a cross-head speed of 200 mm/min using a test apparatus of U.T.M (manufacturer: Instron, model name: 4466), and a point where the 1T specimen was cut was measured. The tensile strength was calculated as follows:

Tensile strength (kgf/cm$^2$)=load value (kgf)/thickness (cm)×width (cm)

3) Measurement of elongation rate: "Elongation rate" was measured according to ASTM D638. After pulling at a cross head speed of 200 mm/min by using the U.T.M, a position where the 1T specimen was cut was measured, and the elongation rate was calculated as follows:

Elongation rate (%)=length after elongation/initial length×100.

4) Measurement of migration loss: According to KSM-3156, a specimen with a thickness of 2 mm or more was obtained, and glass plates were attached onto both sides of the 1T specimen and a load of 1 kgf/cm$^2$ was applied. The specimen was stood in a hot air circulation oven (80° C.) for 72 hours and was taken out and cooled at room temperature for 4 hours. After that, the glass plates attached onto both sides of the specimen are removed, and the weights of the glass plates and the specimen plate before and after being left standing in the oven are measured. The migration loss was calculated by the following equation.

elongation rate of a specimen. The measurement method is the same as that of the elongation rate.

(5) Evaluation Results

The evaluation results on the test items are shown in Tables 2 and 3 below.

TABLE 2

|  | Hardness (Shore "A") | Hardness (Shore "D") | Migration loss (%) | Volatile loss (%) 80° C. | Volatile loss (%) 100° C. | Tensile strength (kgf/cm$^2$) | Elongation rate (%) | Elongation retention (%) |
|---|---|---|---|---|---|---|---|---|
| Example 1 | 84.0 | 37.2 | 1.03 | 0.91 | 1.37 | 190.4 | 313.6 | 97.3 |
| Example 2 | 85.7 | 39.4 | 1.27 | 1.24 | 1.65 | 181.7 | 308.4 | 95.6 |
| Example 3 | 86.0 | 40.2 | 1.02 | 0.56 | 1.02 | 215.9 | 311.2 | 96.3 |
| Example 4 | 86.0 | 40.1 | 1.10 | 0.54 | 1.00 | 218.4 | 308.4 | 96.0 |
| Example 5 | 83.0 | 36.1 | 0.92 | 0.95 | 1.40 | 211.0 | 306.5 | 93.5 |
| Example 6 | 88.2 | 41.5 | 1.30 | 0.40 | 0.92 | 220.4 | 310.2 | 98.4 |
| Example 7 | 86.9 | 40.7 | 1.33 | 0.41 | 0.92 | 218.5 | 314.5 | 99.2 |
| Example 8 | 86.2 | 40.3 | 1.35 | 0.48 | 0.98 | 217.6 | 310.9 | 98.2 |
| Comparative Example 1 | 84.6 | 38.3 | 1.31 | 1.26 | 3.10 | 180.0 | 285.6 | 90.5 |
| Comparative Example 2 | 86.9 | 40.6 | 2.08 | 0.71 | 1.29 | 197.8 | 290.3 | 93.6 |
| Comparative Example 3 | 88.4 | 41.7 | 5.91 | 0.81 | 1.47 | 197.5 | 310.8 | 92.7 |
| Comparative Example 4 | 90.5 | 43.6 | 1.92 | 0.21 | 0.56 | 205.6 | 301.2 | 95.8 |
| Comparative Example 5 | 82.8 | 36.0 | 1.10 | 1.84 | 3.02 | 175.8 | 287.5 | 93.1 |
| Comparative Example 6 | 88.7 | 41.7 | 1.45 | 1.24 | 2.35 | 187.6 | 295.3 | 93.5 |
| Comparative Example 7 | 85.5 | 39.2 | 1.75 | 1.65 | 3.47 | 175.3 | 284.3 | 84.2 |
| Comparative Example 8 | 81.2 | 34.6 | 1.46 | 3.58 | 6.28 | 165.2 | 265.8 | 78.5 |
| Comparative Example 9 | 83.8 | 37.0 | 1.60 | 2.74 | 5.82 | 172.1 | 280.0 | 81.0 |
| Comparative Example 10 | 88.9 | 41.6 | 2.48 | 1.58 | 2.66 | 180.2 | 288.3 | 95.2 |
| Comparative Example 11 | 91.3 | 43.9 | 2.33 | 0.84 | 1.25 | 182.6 | 295.1 | 96.1 |
| Comparative Example 12 | 87.9 | 41.1 | 2.08 | 0.90 | 1.33 | 191.2 | 274.0 | 93.4 |
| Comparative Example 13 | 86.2 | 40.2 | 1.56 | 1.84 | 3.66 | 169.4 | 270.8 | 82.4 |
| Comparative Example 14 | 82.1 | 35.4 | 1.50 | 3.64 | 6.87 | 154.6 | 248.9 | 75.3 |

Migration loss (%)={[(initial weight of specimen at room temperature)−(weight of specimen after being left standing in oven)]/(initial weight of specimen at room temperature)}×100

5) Measurement of volatile loss: The specimen manufactured was processed at 80° C. for 72 hours, and the weight of the specimen was measured.

The volatile loss was calculated as follows:

Volatile loss (wt %)={[(weight of initial specimen)−(weight of specimen after processing)]/(weight of initial specimen)}×100

6) Stress test (stress resistance): A specimen having a thickness of 2 mm was left in a bent state at 23° C. for 168 hours, and then the degree of migration (the degree of oozing) was observed, and the result was shown as a numerical value. The numerical value closer to 0 represented the excellent property.

7) Measurement of elongation retention (%): The measurement of elongation retention was performed by applying heat at 100° C. for 168 hours and measuring the remaining

TABLE 3

|  | Stress resistance | | |
|---|---|---|---|
|  | One day elapsed | Two days elapsed | Three days elapsed |
| Example 1 | 1.0 | 1.0 | 0 |
| Example 2 | 1.0 | 0.5 | 0.5 |
| Example 3 | 0 | 0 | 0 |
| Example 4 | 0 | 0 | 0 |
| Example 5 | 0 | 0 | 0 |
| Example 6 | 0 | 0.5 | 0.5 |
| Example 7 | 0 | 0.5 | 0.5 |
| Example 8 | 0 | 0.5 | 0.5 |
| Comparative Example 1 | 0.5 | 1.0 | 0 |
| Comparative Example 2 | 1.0 | 1.5 | 1.0 |
| Comparative Example 3 | 1.5 | 3.0 | 3.0 |
| Comparative Example 4 | 1.0 | 1.5 | 2.5 |
| Comparative Example 5 | 0.5 | 1.0 | 1.0 |
| Comparative Example 6 | 1.0 | 2.0 | 2.0 |
| Comparative Example 7 | 0.5 | 0.5 | 1.0 |
| Comparative Example 8 | 0.5 | 0.5 | 0.5 |
| Comparative Example 9 | 0.5 | 0.5 | 0.5 |
| Comparative Example 10 | 1.0 | 2.0 | 2.5 |

TABLE 3-continued

|  | Stress resistance | | |
| --- | --- | --- | --- |
|  | One day elapsed | Two days elapsed | Three days elapsed |
| Comparative Example 11 | 1.5 | 2.5 | 3.0 |
| Comparative Example 12 | 1.0 | 1.5 | 2.0 |
| Comparative Example 13 | 0.5 | 0.5 | 1.0 |
| Comparative Example 14 | 0.5 | 0 | 0 |

Referring to Tables 2 and 3 above, Examples 1 to 8 to which the plasticizer composition according to an embodiment of the present invention was applied, showed significantly improved plasticization efficiency and migration loss compared to Comparative Examples 1 to 3, which are used as conventional products. It can be found that Examples 1 to 8 also showed excellent elongation retention and stress resistance.

Also, Comparative Examples 4 to 6 are obtained by applying the citrate prepared from one type of alcohol without hybridizing the alkyl groups of the citrate with two or more alcohols. Comparative Examples 4 to 6 were found to be inferior in all physical properties compared to Examples 1 to 8, and it can be seen that there is a problem in that the physical properties vary greatly depending on the number of carbon atoms.

Meanwhile, Comparative Examples 7 to 14 are obtained by hybridizing the alkyl groups of two types of alcohols, like Examples according to the present invention, but not adjusting the number of carbon atoms to C5 for the lower alcohols and C8 for the higher alcohols.

Looking at these results, in Comparative Examples 7 to 9 and 13 and 14, in which the number of carbon atoms of the lower alcohols is smaller than C5 or the number of carbon atoms of the higher alcohols is smaller than C8, remarkably poor tensile strength and elongation rate were shown and the elongation retention was very poor. Therefore, it can be confirmed that the flexibility is greatly lost in a high-temperature environment, and the deterioration of the volatile loss can also be confirmed.

Also, although Comparative Example 10 in which the number of carbon atoms of the lower alcohol is smaller than C5 and the number of carbon atoms of the higher alcohol is larger than C8, may have similar average weightiness to Examples, it shows poor elongation rate like other Comparative Examples. It can be seen that there is a large loss of physical properties such as migration loss and volatile loss. It is confirmed that the stress resistance is also not good compared to Examples.

Besides, it can be found that Comparative Examples 11 and 12 in which the number of carbon atoms of the higher alcohols is larger than C8 or the number of carbon atoms of the lower alcohols is larger than C5, show poor elongation rate, migration loss, and stress resistance, in a similar trend to Comparative Example 10.

Thus, when applying citrate as a plasticizer as in Examples of the present invention, it could be found that: it is necessary to use two or more alcohols, but to use C5 and C8 alcohols in combination, thereby hybridizing the alkyl groups of the citrate; and in that case, implementation of a plasticizer having excellent performance is possible.

The invention claimed is:

1. A plasticizer composition comprising a citrate-based composition containing three or more citrates represented by the following Formula 1,

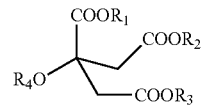

[Formula 1]

wherein, Formula 1, $R_1$ to $R_3$ are each independently an alkyl group having five or eight carbon atoms, and $R_4$ is hydrogen or an acetyl group, the alkyl group having five carbon atoms is derived from a C5 alcohol selected from the group consisting of n-pentanol, 3-methylbutanol, and a mixture of n-pentanol and 3-methylbutanol with a ratio of 7:3 or 9:1, the alkyl group having eight carbon atoms is derived from 2-ethyl hexanol, and wherein the citrate-based composition comprises:

(I) a lower alkyl-based citrate including:

(I-i) 2.1-35.6 weight % of a lower non-hybrid citrate having the C5 alcohol-derived alkyl group in $R_1$, $R_2$ and $R_3$ in Formula 1 with respect 100 weight % of the citrate-based composition, and (I-ii) 16.9 to 45.7 weight % of a lower hybrid citrate having the C5 alcohol-derived alkyl group and the C8 alcohol-derived alkyl group in $R_1$, $R_2$ and $R_3$ in Formula 1 with the proviso that the lower hybrid citrate includes the C5 alcohol-derived alkyl group more than the C8 alcohol-derived alkyl groups with respect 100 weight % of the citrate-based composition, (I) a higher alkyl-based citrate including:

(II-i) 17.5 to 45.0 weight % of a higher hybrid citrate having the C5 alcohol-derived alkyl group and the C8 alcohol-derived alkyl group in $R_1$, $R_2$ and $R_3$ in Formula 1 with the proviso that the higher hybrid citrate includes the C8 alcohol-derived alkyl groups more than the C5 alcohol-derived alkyl groups with respect 100 weight % of the citrate-based composition, and (II-ii) 1.2 to 37.0 weight % of a higher non-hybrid citrate having the C8 alcohol-derived alkyl group in $R_1$, $R_2$ and $R_3$ in Formula 1 with respect 100 weight % of the citrate-based composition, wherein a weight ratio of the lower alkyl-based citrate to the higher alkyl-based citrate is 19-81.3:18.7-81, wherein the weight ratio of the sum of the non-hybrid citrates to the sum of the hybrid citrates is 26.8-39.1: 60.9-73.2.

2. The plasticizer composition of claim 1, wherein the C5 alcohol includes n- pentanol.

3. The plasticizer composition of claim 1, wherein the alkyl group having five carbon atoms is derived from 3-methylbutanol.

4. A resin composition comprising: 100 parts by weight of a resin; and 5 to 150 parts by weight of the plasticizer composition of claim 1.

5. The resin composition of claim 4, wherein the resin is one or more selected from the group consisting of a straight vinyl chloride polymer, a paste vinyl chloride polymer, an ethylene vinyl acetate copolymer, an ethylene polymer, a propylene polymer, polyketone, polystyrene, polyurethane, natural rubbers, and synthetic rubbers.

* * * * *